(12) United States Patent
Elfadel et al.

(10) Patent No.: US 9,317,644 B2
(45) Date of Patent: Apr. 19, 2016

(54) GENERATING CAPACITANCE LOOK-UP TABLES FOR WIRING PATTERNS IN THE PRESENCE OF METAL FILLS

(71) Applicant: GLOBALFOUNDRIES Inc., Grand Cayman (KY)

(72) Inventors: Ibrahim M. Elfadel, Cortlandt Manor, NY (US); Tarek Ali El Moselhy, Medford, MA (US); David J. Widiger, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 309 days.

(21) Appl. No.: 13/887,491

(22) Filed: May 6, 2013

(65) Prior Publication Data

US 2013/0246992 A1   Sep. 19, 2013

Related U.S. Application Data

(63) Continuation of application No. 13/449,009, filed on Apr. 17, 2012, now Pat. No. 8,495,540, which is a continuation of application No. 12/648,456, filed on Dec. 29, 2009, now Pat. No. 8,245,169.

(51) Int. Cl.
*G06F 17/50* (2006.01)

(52) U.S. Cl.
CPC ........ *G06F 17/5072* (2013.01); *G06F 17/5036* (2013.01); *G06F 17/5068* (2013.01); *G06F 17/5081* (2013.01); *G06F 2217/12* (2013.01); *H05K 2201/09781* (2013.01)

(58) Field of Classification Search
None
See application file for complete search history.

(56) References Cited

U.S. PATENT DOCUMENTS

| | | | |
|---|---|---|---|
| 6,185,722 B1 | 2/2001 | Darden et al. |
| 6,865,727 B2 | 3/2005 | Frerichs et al. |
| 7,016,820 B2 | 3/2006 | Kimura et al. |
| 7,350,167 B1 | 3/2008 | Lenehan |
| 7,373,620 B1 | 5/2008 | Lenehan |

(Continued)

OTHER PUBLICATIONS

Y. Chen et al., "Area Fill Synthesis for Uniform Layout Density", IEEE Trans on Computer-Aided Design of Int. Cir. and Sys., Oct. 2002, vol. 21, No. 10, pp. 1132-1147.

(Continued)

*Primary Examiner* — Annette Thompson
(74) *Attorney, Agent, or Firm* — Anthony Canale; Andrew M. Calderon; Roberts, Mlotkowski, Safran & Cole PC

(57) ABSTRACT

A computer system selects a signal conductor from an electronic circuit design layout and assigns a first potential to the selected signal conductor. Next, the computer system assigns a second potential to other signal conductors included in the electronic circuit design layout. The computer system then selects a metal fill from the electronic circuit design layout, which is void from carrying an electrical signal, and generates a zero charge equation for the selected metal fill. The zero charge equation establishes that a total charge residing on the selected metal fill is equal to zero. The computer system includes the zero charge equation in a system of equations, which includes grid point potential equations, and solves the system of equations. In turn, the computer system computes capacitance values for the signal conductors based upon the system of equation solutions, and simulates the electronic circuit design layout using the computed capacitance values.

20 Claims, 8 Drawing Sheets

(56) References Cited

U.S. PATENT DOCUMENTS

| | | |
|---|---|---|
| 7,448,010 B1 | 11/2008 | Lenehan et al. |
| 7,725,859 B1 | 5/2010 | Lenahan et al. |
| 8,024,677 B2 | 9/2011 | Lenahan et al. |
| 2007/0220459 A1 | 9/2007 | Gurney |
| 2008/0133201 A1 | 6/2008 | Guedon |
| 2010/0270671 A1 | 10/2010 | Holesovsky et al. |

OTHER PUBLICATIONS

B.E. Stine et al. "The Physical and Electronic Effects of Metal-Fill Patterning Practices", IEEE Trans.on Electron Devices, Mar. 1998, vol. 45, No. 3, pp. 665-679.

N. P. van der Meijs et al., "An efficient finite element method for submicron IC capacitance extraction," Proc of 26th ACM/IEEE Design Automation Conf., 1989, pp. 678-681.

K. Yamaguchi et al., "Capacitance analysis of devices with electrically floating regions", Solid-State Electronics, vol. 48, Issue 12, Dec. 2004, pp. 2115-2124.

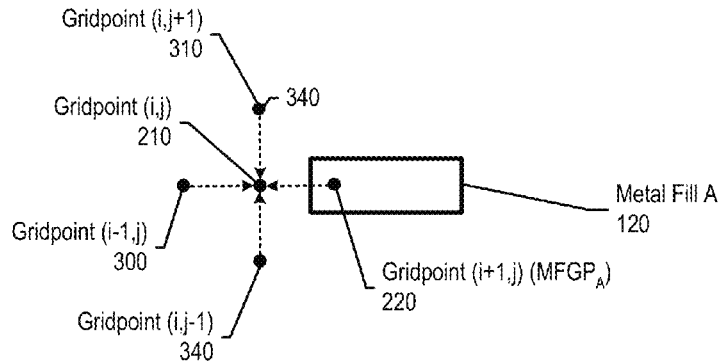

Gridpoint (i,j+1) 310
340
Gridpoint (i,j) 210
Metal Fill A 120
Gridpoint (i-1,j) 300
Gridpoint (i+1,j) (MFGP$_A$) 220
Gridpoint (i,j-1) 340

FIG. 3A

Gridpoint Potential Equation 340

$$\varepsilon_{-,-}\left(y(j)-y(j-1)\right)\frac{\phi(i-1,j)-\phi(i,j)}{x(i)-x(i-1)} + \varepsilon_{-,+}\left(y(j+1)-y(j)\right)\frac{\phi(i-1,j)-\phi(i,j)}{x(i)-x(i-1)}$$

$$\text{MFGP}_A \qquad\qquad\qquad\qquad\qquad \text{MFGP}_A$$

$$+\varepsilon_{+,-}\left(y(j)-y(j-1)\right)\frac{\phi(i+1,j)-\phi(i,j)}{x(i+1)-x(i)} + \varepsilon_{+,+}\left(y(j+1)-y(j)\right)\frac{\phi(i+1,j)-\phi(i,j)}{x(i+1)-x(i)}$$

$$+\varepsilon_{-,-}\left(x(i)-x(i-1)\right)\frac{\phi(i,j-1)-\phi(i,j)}{y(j)-y(j-1)} + \varepsilon_{+,-}\left(x(i+1)-x(i)\right)\frac{\phi(i,j-1)-\phi(i,j)}{y(j)-y(j-1)}$$

$$+\varepsilon_{-,+}\left(x(i)-x(i-1)\right)\frac{\phi(i,j+1)-\phi(i,j)}{y(j+1)-y(j)} + \varepsilon_{+,+}\left(x(i+1)-x(i)\right)\frac{\phi(i,j+1)-\phi(i,j)}{y(j+1)-y(j)}$$

FIG. 3B

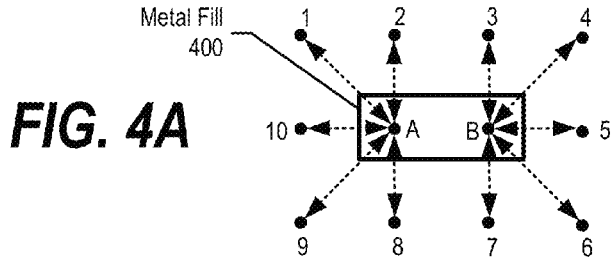

FIG. 4A

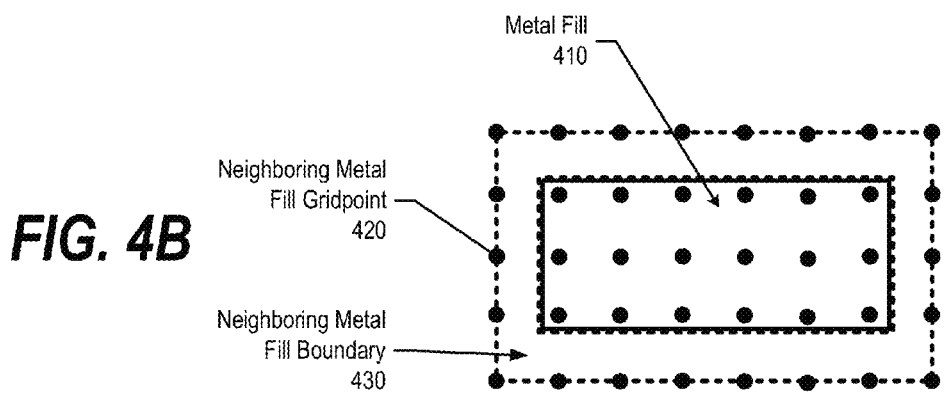

FIG. 4B

Zero Charge Equation
440

$$0 = \oint \varepsilon \vec{n} \cdot \nabla \phi = \sum_{i,j \in \text{floating metal boundary}}$$

$$\varepsilon_{-,-}(y(j)-y(j-1))\frac{\phi(i-1,j)-\phi(i,j)}{x(i)-x(i-1)} + \varepsilon_{-,+}(y(j+1)-y(j))\frac{\phi(i-1,j)-\phi(i,j)}{x(i)-x(i-1)}$$

$$+\varepsilon_{+,-}(y(j)-y(j-1))\frac{\phi(i+1,j)-\phi(i,j)}{x(i+1)-x(i)} + \varepsilon_{+,+}(y(j+1)-y(j))\frac{\phi(i+1,j)-\phi(i,j)}{x(i+1)-x(i)}$$

$$+\varepsilon_{-,-}(x(i)-x(i-1))\frac{\phi(i,j-1)-\phi(i,j)}{y(j)-y(j-1)} + \varepsilon_{+,-}(x(i+1)-x(i))\frac{\phi(i,j-1)-\phi(i,j)}{y(j)-y(j-1)}$$

$$+\varepsilon_{-,+}(x(i)-x(i-1))\frac{\phi(i,j+1)-\phi(i,j)}{y(j+1)-y(j)} + \varepsilon_{+,+}(x(i+1)-x(i))\frac{\phi(i,j+1)-\phi(i,j)}{y(j+1)-y(j)}$$

GENERATING CAPACITANCE LOOK-UP TABLES FOR WIRING PATTERNS IN THE PRESENCE OF METAL FILLS

TECHNICAL FIELD

The present invention relates to generating capacitance look-up tables for wiring patterns in the presence of metal fills. More particularly, the present invention relates to using a charge neutrality principle of floating metal fill conductors in order to reduce capacitance computations for use in device simulation.

BACKGROUND

An electronic design layout, such as for an integrated circuit or printed circuit board, includes many substrate layers. Part of an electronic design's development process is to simulate the electronic design while taking into account the electronic design's layout. Some layers are "conductor" layers that include metal tracks for coupling portions of the electronic design, while other layers are "insulation" layers that isolate the conductor layers from each other. "Metal fills" are included on an electronic design layout in order to mitigate the impact of chemical mechanical polishing (CMP) on the insulation layers during device fabrication by prohibiting the CMP from etching too much into an insulation layer.

SUMMARY

A computer system selects a signal conductor from an electronic circuit design layout and assigns a first potential to the selected signal conductor. Next, the computer system assigns a second potential to other signal conductors included in the electronic circuit design layout. The computer system then selects a metal fill from the electronic circuit design layout, which is void from carrying an electrical signal, and generates a zero charge equation for the selected metal fill. The zero charge equation establishes that a total charge residing on the selected metal fill is equal to zero. The computer system includes the zero charge equation in a system of equations, which includes grid point potential equations, and solves the system of equations. In turn, the computer system computes capacitance values for the signal conductors based upon the system of equation solutions, and simulates the electronic circuit design layout using the computed capacitance values.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 3A is a diagram showing a relationship between a neighboring metal fill grid point and adjacent grid points in order to generate a grid point potential equation;

FIG. 3B shows a grid point potential equation that is generated for each non-conducting surface grid point;

FIG. 4A is a diagram showing potential differences between metal fill grid points and neighboring grid points;

FIG. 4B shows a grid point layout that includes closely spaced grid points for computing capacitance values;

FIG. 4C shows an example of a zero charge equation that is generated for each metal fill;

DETAILED DESCRIPTION

Figure 1:
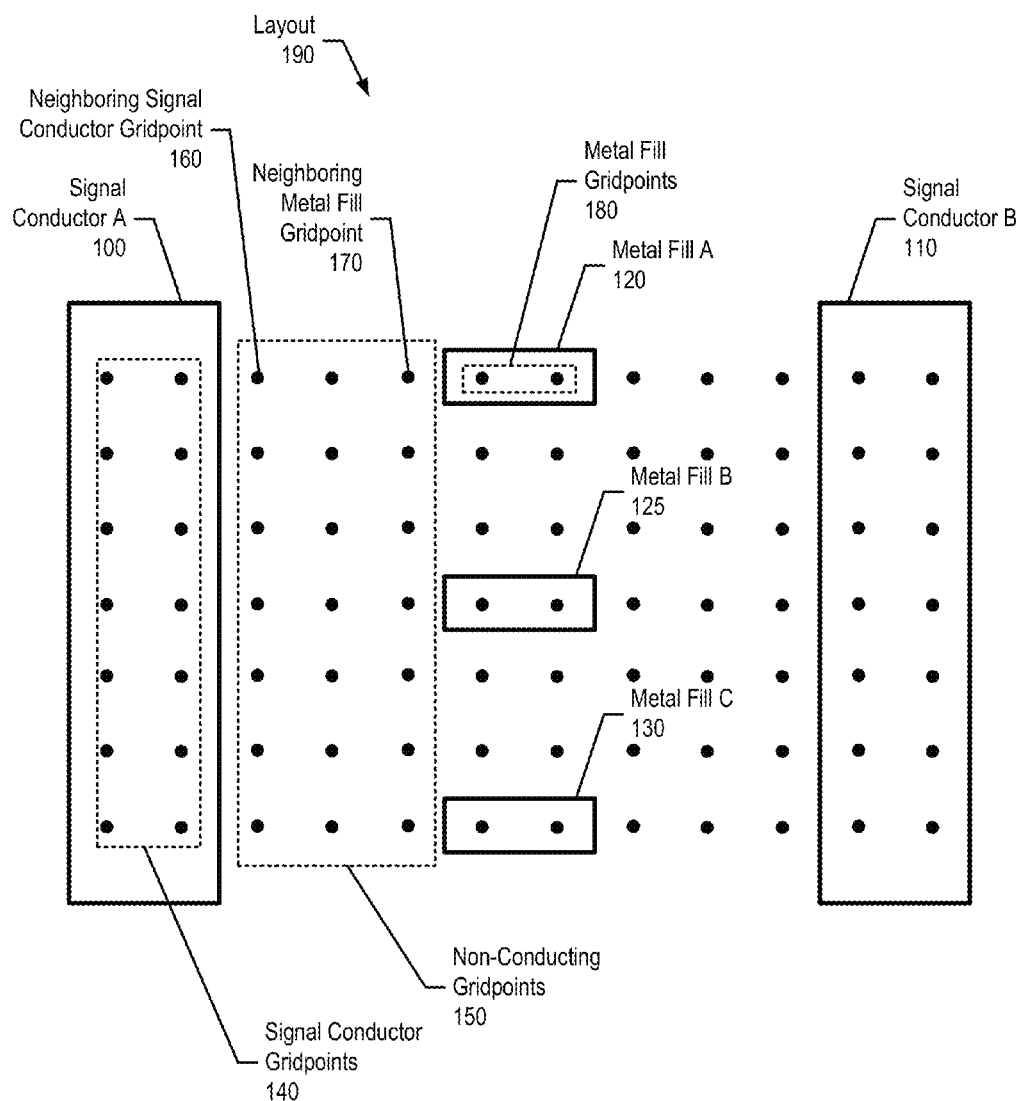
FIG. 1 is a diagram showing an electronic design layout, such as an integrated circuit layout or a printed circuit board layout, which includes signal conductors and metal fills.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 8 that is suitable to implement the software and/or hardware techniques associated with the disclosure.

FIG. 1 is a diagram showing an electronic design layout, such as an integrated circuit layout or a printed circuit board layout, that includes signal conductors and metal fills. Layout 190 includes signal conductors A 100 and B 110, which are metal tracks that carry signals from one portion of a circuit to another portion of a circuit. During device operation, these circuits apply electronic signals to signal conductors A 110 and/or B 110 corresponding to either a logical value of "1" or "0." Capacitance induced on the signal conductors (e.g., self capacitance and coupling capacitance) plays a role in determining the speed at which the electronic signals propagate along the signal conductors. In order to properly simulate a design, layout considerations are taken into account and, therefore, signal conductor capacitance values are computed in order to effectively simulate how capacitances effect signal propagation along the signal conductors.

Layout 190 also includes metal fills A 120, B 125, and C 130. The metal fills are not utilized in a device's actual design to propagate signals but, instead, are inserted into a device layout for fabrication purposes. Metal fills control metal density on VLSI chips and, therefore mitigate the impact of a chemical mechanical polishing (CMP) process on metal thickness. Since metal fills are not signal-carrying conductors, this disclosure treats metal fills A 120, B 125, and C 130 as electrostatically floating conductors.

Capacitance value computations involve overlaying grid points onto the device layout and computing charge values for each grid point. FIG. 1 shows that some grid points reside on the signal conductors (grid points 140); some grid points reside on the metal fills (grid points 180); and some grid points reside on non-conducting surfaces (grid points 150). As those skilled in the art can appreciate, grid point layouts may be non-symmetrical in nature and have a much finer granularity than what is shown in FIG. 1.

Grid points that are adjacent to a signal conductor are referred to herein as "neighboring signal conductor grid points" (e.g., grid point 160). Charges computed on these grid points play a key role in computing the capacitance values for the signal conductors (see FIG. 5 and corresponding text for further details). Grid points adjacent to metal fills are referred to herein as "neighboring metal fill grid points" (e.g., grid point 170).

A "system of equations" are generated based upon the grid points, which include 1) grid point potential equations and 2) zero charge equations. Grid point potential equations are generated for each non-conducting grid point, which utilize a 5-point finite difference equation that factors in dielectric constants and directional potential differences between adjacent grid points (see FIG. 3B and corresponding text for further details). Zero charge equations are generated for each metal fill, which is based on the premise that the total charge on a metal fill is zero due to the fact that metal fills are not signal-carrying conductors, but rather floating conductors (see FIG. 4C and corresponding text for further details).

Figure 2A:
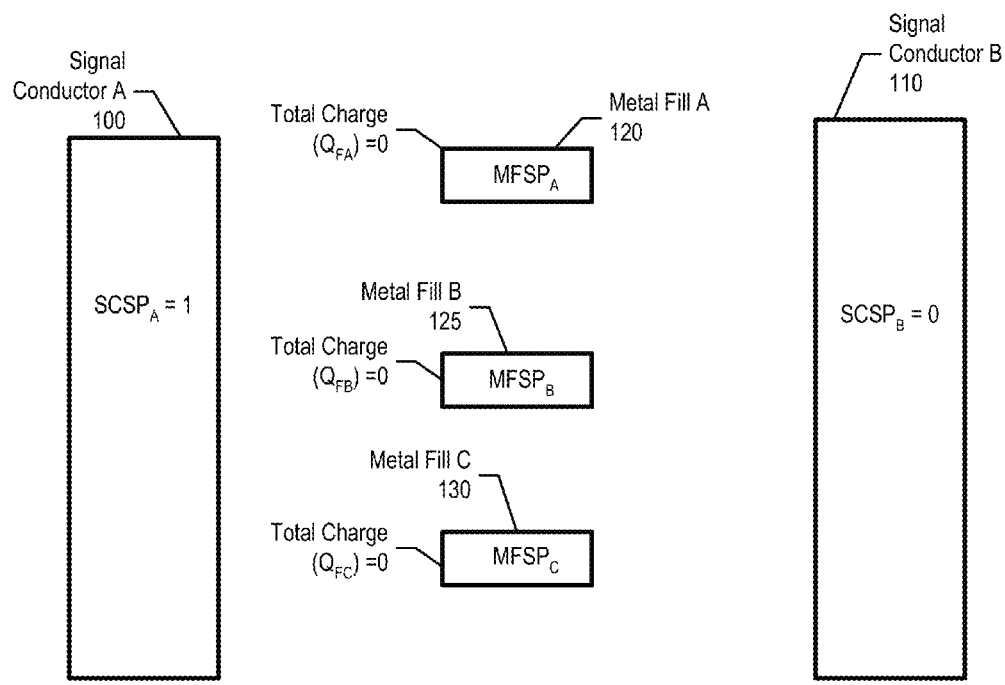
FIG. 2A is a diagram showing potentials (voltage potentials) assigned to signal conductors along with metal fill surface.

FIG. 2A is a diagram showing potentials (voltage potentials) assigned to signal conductors along with metal fill surface potential variables assigned to metal fills during capacitance computations. Boundary conditions are established for computing capacitances, which include assigning a potential of "1" to a particular signal conductor, and assigning a potential of "0" to the remaining signal conductors. This boundary condition represents a logical 1 on one signal conductor and a logical 0 on the other signal conductors. FIG. 2A shows that signal conductor A 100 is assigned a signal conductor surface potential (SCSP) of "1," and signal conductor B 110 is assigned an signal conductor surface potential of "0."

Metal fills A 120, B 125, and C 130 will have a surface potential somewhere between "1" and "0" because they are physically between signal conductor A 100 and signal conductor B 110. Their surface potential, however, is unknown at this point. As such, each metal fill is assigned a metal fill surface potential (MFSP) variable. As can be seen, metal fills A 120, B 125, and C 130 are assigned metal fill surface potential variables $MFSP_A$, $MSFP_B$, and $MFSP_C$, respectively. The metal fill surface potentials are subsequently related to metal fill grid points that, in turn, are factored into grid point potential equations (see FIG. 2B-3B and corresponding text for further details).

Figure 2B:
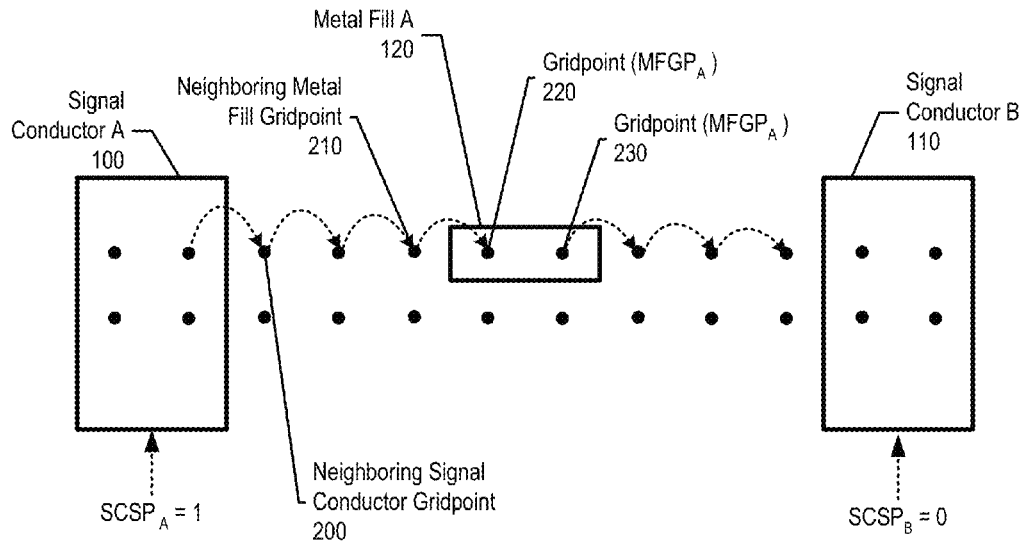
FIG. 2B is a diagram showing grid point potentials residing on a metal fill.

FIG. 2B is a diagram showing grid point potentials residing on a metal fill. When signal conductor A 100 is assigned a potential of "1" and signal conductor B 110 is assigned a potential of "0," the potential values on grid points between the signal conductors decreases as they are farther away from signal conductor A 100 and closer to signal conductor 110. For example, the potential at neighboring signal conductor grid point 200 is higher than the potential at neighboring metal fill grid point 210.

Grid points residing on metal fill A 120, however, all have the same potential due to the fact that metal fill A 120 is a conducting surface. As such, grid point 220 has the same grid point potential as grid point 230. Since this grid point potential is unknown at this point, each of grid points 220 and 230 are assigned a metal fill grid point potential (MFGP) variable. The metal fill grid point potential variable is the same as the metal fill surface potential variable as discussed in FIG. 2A due to the conducting properties of metal fill A 120. As a result, grid point potential equations are generated for neighboring metal fill grid points that include the metal fill grid point potential variables (see FIG. 3A and corresponding text for further details).

FIG. 3A is a diagram showing a relationship between a neighboring metal fill grid point and adjacent grid points in order to generate a grid point potential equation. Grid point 210 is the same as that shown in FIG. 2B, and is adjacent to metal fill A 120. Grid point 210's potential is derived by the potential value of its adjacent grid points (310, 340, 220, and 300). Grid point 210 is located at position "i,j," which positions its adjacent grid points at "i, j+1," "i, j−1," "i+1, j," and i−1, j." Since one of grid point 210's adjacent grid points resides on metal fill A 120 (grid point 220), the grid point potential equation for grid point 210 includes grid point 220's corresponding metal fill grid point potential variable (MFGP_A, see FIG. 3B and corresponding text for further details).

FIG. 3B shows a grid point potential equation that is generated for each non-conducting surface grid point. Grid point potential equation 340 is a 5-point finite difference equation that factors in dielectric constants (epsilons) and directional potential differences between adjacent grid points. FIG. 3B shows that, when generating a grid point potential equation for grid point 210 shown in FIG. 3A, grid point 220's corresponding metal fill grid point potential variable ($MFGP_A$) is included as the potential for grid point "i−1, j."

Each metal fill adds a variable (e.g., $MFGP_A$) to its neighboring grid point potential equations. Meaning, the variable $MFGP_A$ is added to grid point potential equations for neighboring grid points around metal fill A 120, and the variable $MFGP_B$ is added to grid point potential equations for neighboring grid points around metal fill B 125 (see FIG. 6 and corresponding text for further details).

In addition, a zero charge equation is added to the system of equations for each metal fill (see FIGS. 4A-4C and corresponding text for further details). As a result, by adding the same number of zero charge equations as the number of metal fill grid point potential variables to the system of equations, the system of equations in terms of the capacitances of the signal-carrying conductors remains solvable.

FIG. 4A is a diagram showing potential differences between metal fill grid points and neighboring grid points. As discussed earlier, due to the fact that the total charge on a metal fill (metal fill 400) is zero, the sum of the potential differences between all of the metal fill grid points and neighboring grid points is zero. For example, although the potential between FIG. 4A's grid point A and grid point 1 may have a value, the sum of all of the potentials (arrows), and thus the charge induced on the surface, around metal fill 400 (boundary) is equal to zero. In simple formula terms where $P_{xy}$ is the potential difference between grid point x and grid point y:

$$\text{Total Boundary Charge} = 0 = P_{A1} + P_{A2} + P_{A8} + P_{A9} + P_{A10} + P_{B3} + P_{B4} + P_{B5} + P_{B6} + P_{B7}$$

Since the metal fill grid point potentials are the same and equal to the surface potential of the metal fill (discussed previously), a zero charge equation may be generated for each metal fill, which includes the summation of the potential differences between all of the metal fill grid points and neighboring grid points (see FIG. 4C and corresponding text for further details).

FIG. 4B shows a grid point layout that includes closely spaced grid points for computing capacitance values. For simplification purposes, FIG. 4A showed that grid points are separated in a manner such that only two grid points resided on metal fill 400. As those skilled in the art can appreciate, grid point layouts may have finer granularity than that shown in FIG. 4A. Regardless of the grid point layout granularity, the total charge around a metal fill equals zero. For example, metal fill 410 includes 18 grid points and 22 neighboring grid points (includes neighboring metal fill grid point 420). Neighboring metal fill boundary 430 results in a total boundary charge of zero and, therefore, a zero charge equation may be written to encompass the summation of the potential differences between the metal fill grid points and neighboring grid points.

FIG. 4C shows an example of zero charge equation that is generated for each metal fill. Zero charge equation 440 is similar to grid point potential equation 340 shown in FIG. 3B, with the exception that zero charge equation 440 factors in each neighboring grid point around a metal fill (summation) and the neighboring boundary's total charge equaling zero.

Note that zero-charge equation 440 does not imply that a metal fill's capacitance is zero. Rather, zero-charge equation 440 implies that the metal fill's unknown surface potential is neither 0 nor 1 as with signal-carrying conductors. In terms of the computational grid used for computing the grid point potentials, the unknown surface potential of each metal fill is assigned to each grid point on the metal fill surface. Zero-charge equation 440, therefore, becomes an equation relating the unknown surface potential to the grid point potentials of all the grid points in the immediate neighborhood of the metal fill. A zero charge equation is generated for each metal fill, and the zero charge equations are subsequently added to the system of equations for computation (see FIG. 6 and corresponding text for further details).

Figure 5:
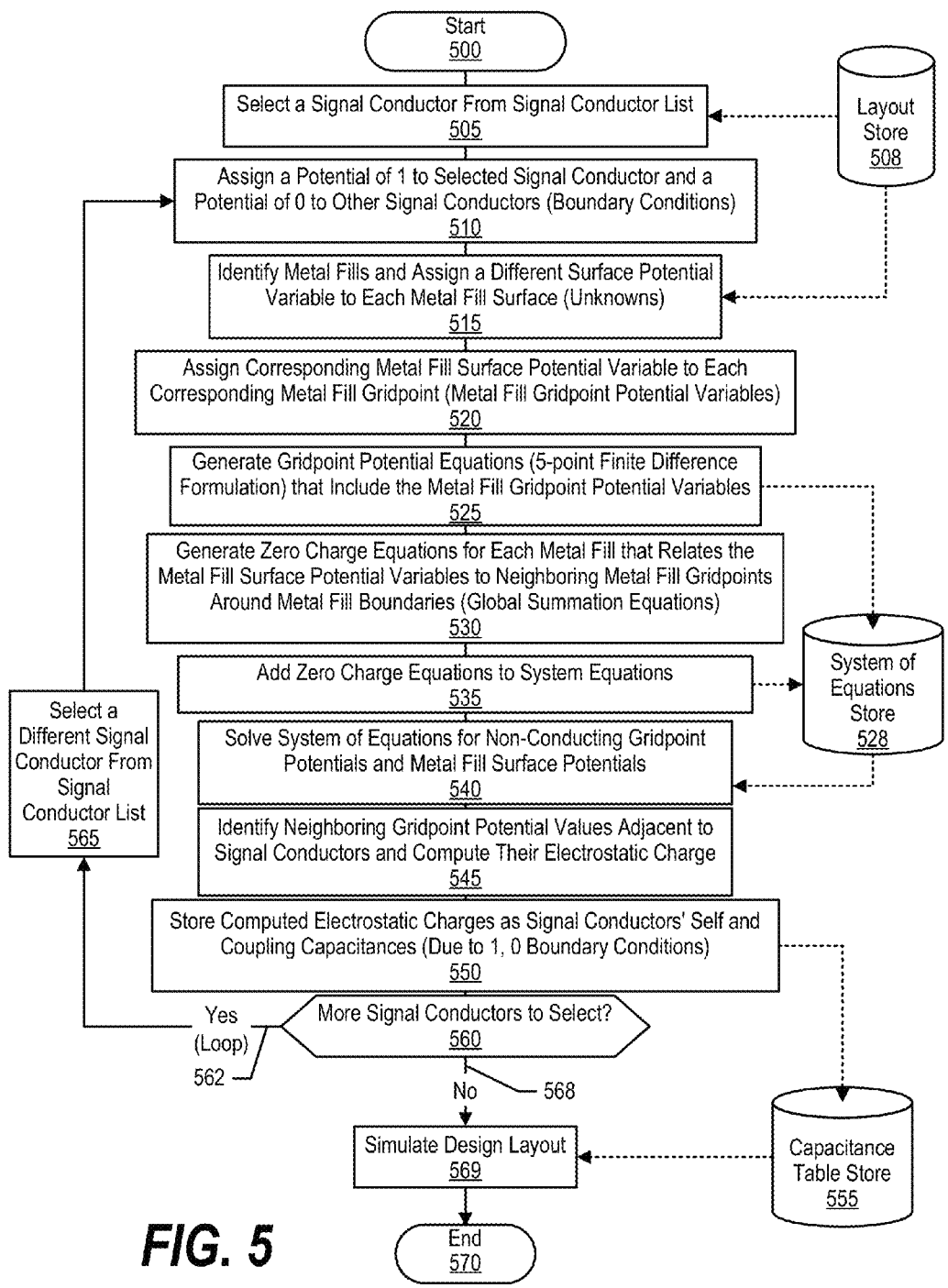
FIG. 5 is a flowchart showing steps taken in computing capacitance values that are utilized during device simulation.

FIG. 5 is a flowchart showing steps taken in computing capacitance values that are utilized during device simulation. Processing commences at 500, whereupon processing selects a signal conductor from a layout file included in layout store 508 (step 505). The layout file includes layout information pertaining to signal conductors and metal fills, such as for an integrated circuit or printed circuit board. At step 510, processing assigns a potential (voltage potential) of "1" to the selected signal conductor, and assigns a "0" potential to the other, non-selected signal conductors. For example, assuming the layout includes 100 signal conductors, processing assigns a "1" to the first signal conductor and assigns a "0" to the remaining 99 signal conductors. Note that the metal fills included in the layout file are not included in voltage potential assignments. Layout store 508 may be stored on a nonvolatile storage area, such as a computer hard drive.

At step 515, processing identifies the metal fills in the layout file and assigns a metal fill surface potential variable to each metal fill. For example, assuming there are 50 metal fills, processing assigns a different metal fill surface potential variable to each of the 50 metal fills, resulting in 50 metal fill surface potential variables.

Next, at step 520, processing overlays a grid point grid; identifies the grid points residing on the metal fills; and assigns a corresponding metal fill grid point potential variable to each metal fill grid point. For example, the first two metal fills may have a metal fill surface potential variable assigned, such as surface potential variable 1 and surface potential variable 2. In this example, each grid point residing on metal fill 1 will have a grid point potential (grid point potential 1) that equals surface potential variable 1, and each grid point residing on metal fill 2 will have a grid point potential (grid point potential 2) that equals surface potential 2.

Processing generates grid point potential equations for each non-conducting grid point at step 525. For those grid points adjacent to a metal fill, processing includes the metal fill grid point potential variables in their grid point potential equations (see FIGS. 3A, 3B, and corresponding text for further details). The grid point potential equations are stored in system of equations store 528. System of equations store 528 may be stored on a volatile or nonvolatile storage area, such as computer memory or a computer hard drive.

Next, processing generates zero charge equations for each metal fill at step 530. A zero charge equation takes into account that the total charge on a metal fill's surface is equal to zero. Meaning, the charge induced on the metal fill surface by the total potential difference between the metal fill grid points and neighboring grid points is zero (see FIGS. 4A-4C and corresponding text for further details). The zero charge equations, for each metal fill, are stored in systems of equations store 528 at step 535. At this, point, the system of equations includes grid point potential equations for each non-conducting grid point and zero charge equations for each metal fill (see FIG. 6 and corresponding text for further details).

Processing solves the system of equations at step 540, which includes solving for the non-conducting grid point potentials (grid points not residing on a signal conductor or a metal fill), as well as solving for metal fill surface potentials (since the metal fill grid point potentials equal their corresponding metal fill surface potentials). At step 545, processing identifies neighboring grid point potential values that are adjacent to the signal conductors (e.g., neighboring signal conductor grid point 160 shown in FIG. 1), and computes an electrostatic charge for each neighboring grid point based upon the solutions from step 540.

Due to the fact that, in step 510, boundary conditions were set at 1 and 0, the electrostatic charges of the neighboring signal conductor grid points are the same as a signal conductor's self and coupling capacitances (Capacitance=Charge/Voltage, where Voltage=1 from the boundary conditions). Therefore, processing stores the computed electrostatic charges as capacitance values for each signal conductor in capacitance table store 555 (step 550).

A determination is made as to whether there are more signal conductors to select and assign a potential of 1 (decision 560). For example, assuming 100 signal conductors, processing loops through steps 510 through 550 100 times, each time assigning a potential of 1 to a different signal conductor. If more signal conductors need to be selected, decision 560 branches to "Yes" branch 562, whereupon processing loops back to select a different signal conductor (step 565), and compute more capacitance values. This looping continues until each signal conductor has been assigned a 1, at which point decision 560 branches to "No" branch 568. Processing simulates the design at step 569 utilizing the capacitance values stored in capacitance table store 555, and processing ends at 570.

Note that the number of times the system of equations is solved is equal to the number of signal-carrying conductors, and is independent of the number of metal fills. The incremental computational cost of augmenting the system of equations with variables describing the surface potentials of the metal fills is negligible when compared with the savings that result from reducing the number of system solutions and the elimination of an inversion of the metal fills own capacitance matrix. (see FIG. 6 and corresponding text for further details).

Figure 6:
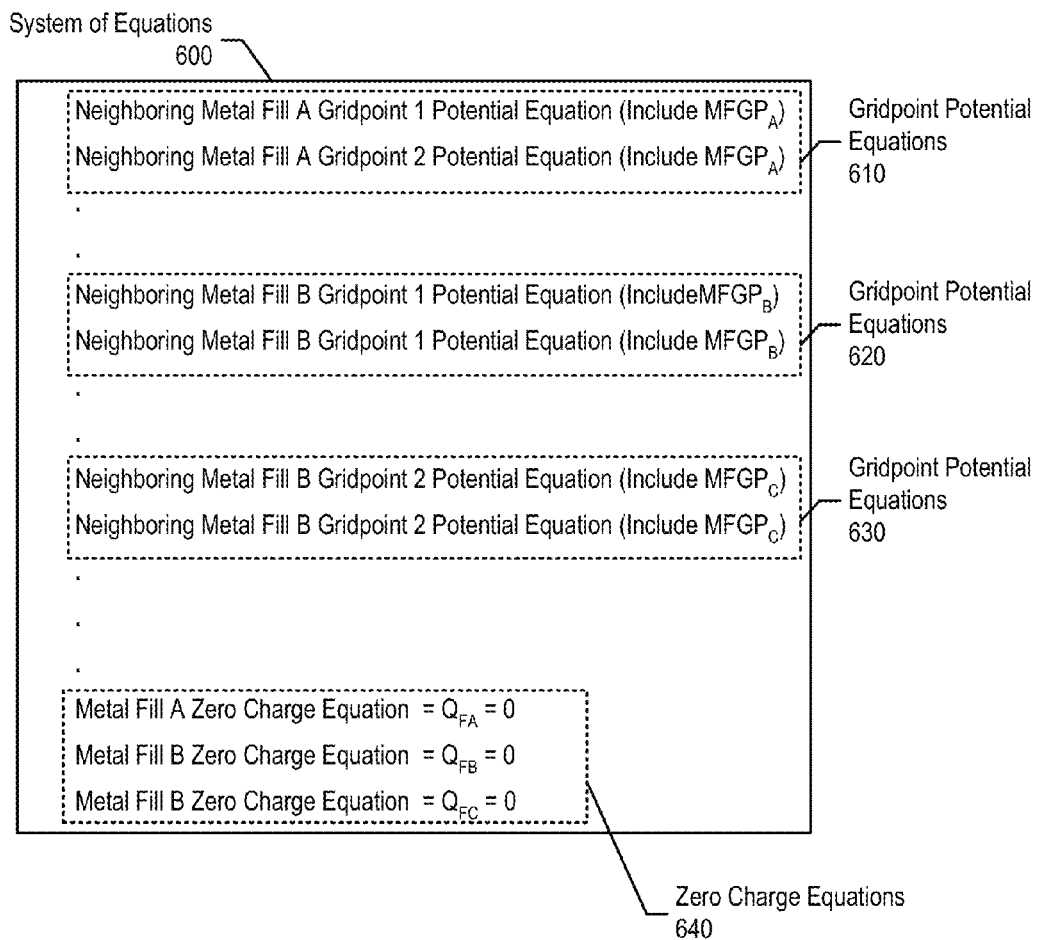
FIG. 6 is a diagram showing a system of equations for computing capacitances that are utilized to simulate a device.

FIG. 6 is a diagram showing a system of equations for computing capacitances that are utilized to simulate a device. System of equations 600 includes a number of grid point equations, such as that shown in FIG. 3B, for each grid point on a device layout. Grid points that are adjacent to, or neighboring, a metal fill will include the metal fill's corresponding metal fill grid point potential variable (discussed in FIGS. 3A and 3B). As can be seen, system of equations 600 includes grid point potential equations 610, which correspond to grid points that neighbor metal fill A 120. System of equations 600 also includes grid point potential equations 620, which correspond to grid points that neighbor metal fill B 125. And, system of equations 600 includes grid point potential equations 630, which correspond to grid points that neighbor metal fill C 130.

In addition, system of equations 600 includes zero charge equations 640 for each of metal fills A 120, B 125, and C 130. The zero charge equations take into account that the total charge on a metal fill is equal to zero (see FIG. 4A-C and corresponding text for further details).

Figure 7A:
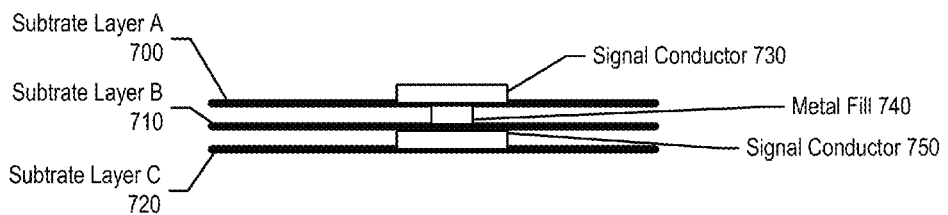
FIG. 7A is a diagram showing a "third" dimension to a device layout.

FIG. 7A is a diagram showing a "third" dimension (3D) to a device layout. An integrated circuit or printed circuit board typically includes multiple substrate layers in order to effectively route signal conductors. The disclosure described herein accounts for capacitance effects between signal conductors and metal fills residing on different substrate layers. FIG. 7 shows three substrate layers A 700, B 710, and C 720.

As those skilled in the art can appreciate, a device's circuit board may include more or less layers than what is shown in FIG. 7A.

Substrate layers A 700 and C 720 include signal conductors 730 and 750, respectively. Between these layers, substrate layer B 710 includes metal fill 740. During capacitance computations, in addition to computing capacitances on a "planar," top-substrate layer as discussed previously, the disclosure described herein computes capacitance values between substrates using the same approach, thus taking into account coupling capacitances resulting from signal conductors "above" and "below" a particular signal conductor.

Figure 7B:
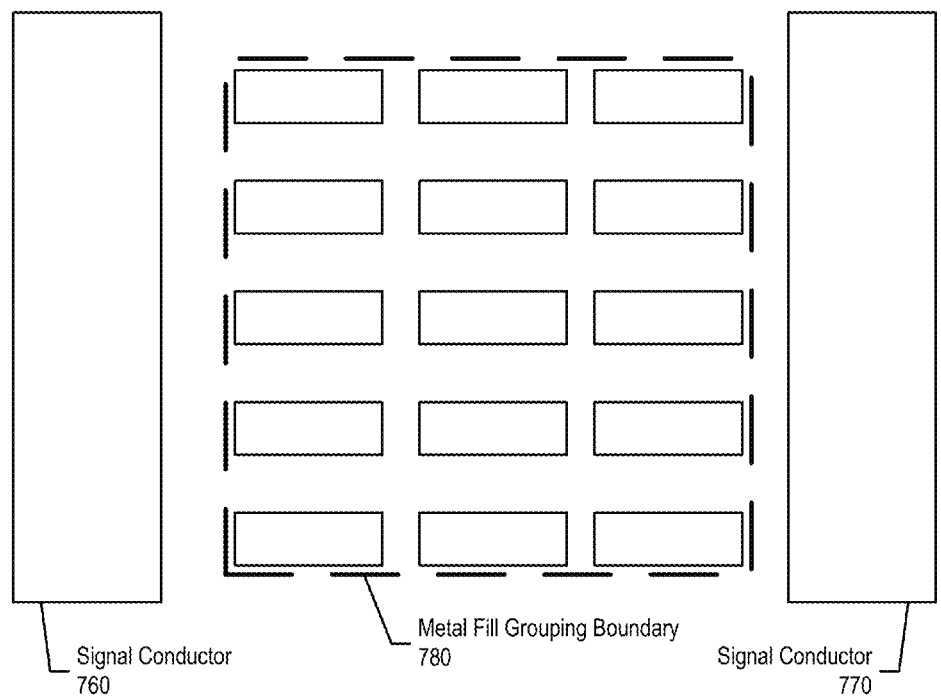
FIG. 7B is a diagram showing an embodiment that groups metal fills together for computing capacitance values.

FIG. 7B is a diagram showing an embodiment that groups metal fills together for computing capacitance values. FIG. 7B shows metal fill grouping boundary 780, which groups 15 metal fills placed between signal conductors 760 and 770. This embodiment may be preferred in situations when metal fills are in close proximity to each other.

In this embodiment, metal fill grouping boundary 780 is considered as a single metal fill for generating grid point potential equations and zero charge equations. Meaning, each of the grid points within metal fill grouping boundary 780 are assigned the same "metal fill grouping grid point potential variable." The zero charge equation assumes that the total charge around metal fill grouping boundary 780 is zero, resulting in a single zero charge equation for the metal fills included in metal fill grouping boundary 780.

Figure 8:
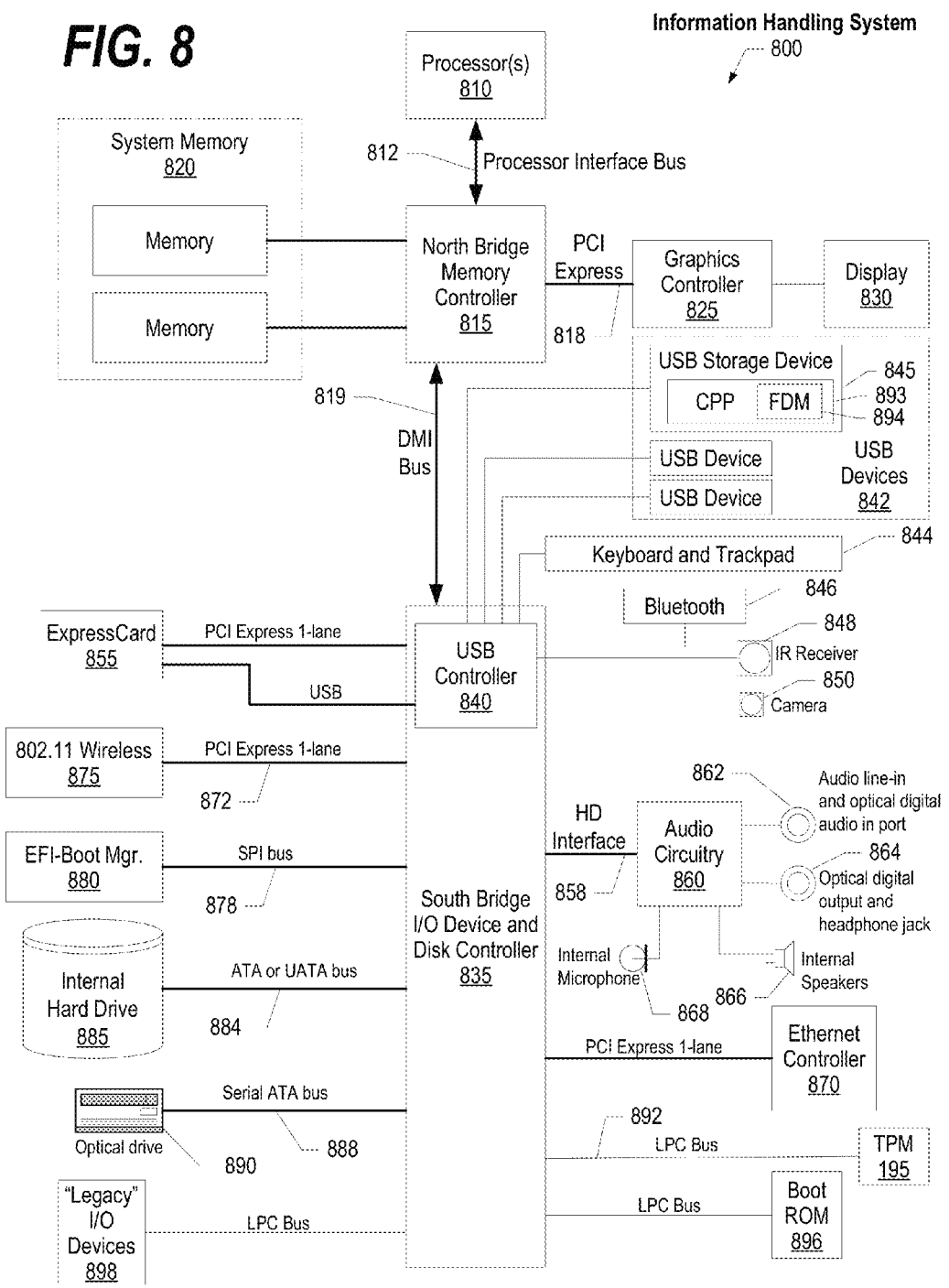
FIG. 8 illustrates and information handling system, which is a simplified example of a computer system capable of performing the computing operations described herein.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. Removable nonvolatile storage device 845, in one embodiment, stores computer program product 893, which includes function descriptive material 894. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method to simulate an electronic design layout comprising:
    retrieving an electronic design layout that identifies a plurality of signal conductors and a plurality of metal fills;
    positioning, by one or more processing devices, metal fill grid points on one or more of the plurality of metal fills;
    selecting one of the plurality of metal fills to establish a selected metal fill;
    assigning a metal fill surface potential variable to at least one of the metal fill grid points;
    generating, by the one or more of the processing devices, a zero charge equation for the selected metal fill, wherein the equation relates the metal fill surface potential variable to neighboring metal fill grid points around a metal fill boundary of the selected metal fill;
    generating, by the one or more of the processing devices, one or more capacitance values corresponding to one or more of the plurality of signal conductors using the zero charge equation; and
    simulating, by the one or more of the processing devices, the electronic design layout using the generated one or more capacitance values.

2. The method of claim 1, wherein each of the plurality of signal conductors carry an electrical signal and each of the plurality of metal fills is devoid of carrying an electrical signal, the method further comprising:
    assigning a first potential to a first one of the plurality of signal conductors and assigning a second potential to a second one of the plurality of signal conductors, the first potential different than the second potential; and
    generating a system of equations that includes the first potential and the second potential, wherein the generation of the capacitance values are based upon the system of equations.

3. The method of claim 2, wherein the one or more capacitance values are generated a number of times that is equal to the number of plurality of signal conductors and, for each of the capacitance value computations, selecting a different one of the plurality of signal conductors for which to assign the first potential.

4. The method of claim 1, wherein a first signal conductor is located on a first substrate layer;
    the selected metal fill is located on a second substrate layer; and
    a second signal conductor is located on a third substrate layer, wherein the second substrate layer is located between the first substrate layer and the second substrate layer.

5. The method of claim 1, further comprising:
    selecting a group of metal fills from the plurality of metal fills;
    establishing a metal fill grouping boundary around the selected group of metal fills;
    generating a zero charge grouping equation for the established metal fill grouping boundary, the zero charge grouping equation establishing that a total group charge residing around the established metal fill grouping boundary is equal to zero; and
    generating the one or more capacitance values using the zero charge grouping equation.

6. The method of claim 1, wherein:
    a plurality of metal fill grid points are positioned on the selected metal fill; and
    a total charge induced on the metal fill from a plurality of potential differences between the plurality of metal fill grid points and the plurality of neighboring metal fill grid points is equal to zero.

7. The method of claim 1, wherein the metal fill surface potential variable corresponds to an unknown voltage potential residing on a top surface of the selected metal fill.

8. An information handling system that simulates an electronic design layout, the information handling system comprising:
    one or more processors;
    a memory accessible by at least one of the one or more processors;
    a nonvolatile storage area accessible by at least one of the one or more processors;
    wherein the memory stores a set of instructions which, when executed by the one or more processors, perform actions of:
        retrieving an electronic design layout from the nonvolatile storage area that identifies a plurality of signal conductors and a plurality of metal fills;
        selecting one of the plurality of metal fills to establish a selected metal fill;
        generating a zero charge equation for the selected metal fill, wherein the equation relates a metal fill surface potential variable of the selected metal fill to neighboring metal fill grid points around a metal fill boundary of the selected metal fill;
        generating one or more capacitance values corresponding to one or more of the plurality of signal conductors using the zero charge equation; and
        simulating the electronic design layout using the generated one or more capacitance values.

9. The information handling system of claim 8, wherein the set of instructions, when executed by one of the processes, causes one of the processors to further perform actions that include:
    assigning a first potential to a first one of the plurality of signal conductors and assigning a second potential to a second one of the plurality of signal conductors, the first potential different than the second potential; and generating a system of equations that includes the first potential and the second potential, wherein the generation of the capacitance values are based upon the system of equations.

10. The information handling system of claim 9, wherein the one or more capacitance values are generated a number of times that is equal to the number of plurality of signal conductors and, for each of the capacitance value computations, selecting a different one of the plurality of signal conductors for which to assign the first potential.

11. The information handling system of claim 8, wherein a first signal conductor is located on a first substrate layer;
the selected metal fill is located on a second substrate layer; and
a second signal conductor is located on a third substrate layer, wherein the second substrate layer is located between the first substrate layer and the second substrate layer.

12. The information handling system of claim 8, wherein the set of instructions, when executed by one of the processes, causes one of the processors to further perform actions that include:
selecting a group of metal fills from the plurality of metal fills;
establishing a metal fill grouping boundary around the selected group of metal fills;
generating a zero charge grouping equation for the established metal fill grouping boundary, the zero charge grouping equation establishing that a total group charge residing around the established metal fill grouping boundary is equal to zero; and
generating the one or more capacitance values using the zero charge grouping equation.

13. The information handling system of claim 8, wherein:
a plurality of metal fill grid points are positioned on the selected metal fill; and
a total charge induced on the metal fill from a plurality of potential differences between the plurality of metal fill grid points and the plurality of neighboring metal fill grid points is equal to zero.

14. The information handling system of claim 8, wherein the metal fill surface potential variable corresponds to an unknown voltage potential residing on a top surface of the selected metal fill.

15. A computer readable storage medium having a computer program product stored thereon, the computer program product comprising instructions which, when executed by an information handling system, causes the information handling system to perform actions that include:
retrieving an electronic design layout that identifies a plurality of signal conductors and a plurality of metal fills;
positioning, by one or more processing devices, metal fill grid points on one or more of the plurality of metal fills;
selecting one of the plurality of metal fills to establish a selected metal fill;
assigning a metal fill surface potential variable to at least one of the metal fill grid points;
generating, by the one or more processing devices, a zero charge equation for the selected metal fill, wherein the equation relates the metal fill surface potential variable to neighboring metal fill grid points around a metal fill boundary of the select metal fill;
generating, by the one or more processing devices, one or more capacitance values corresponding to one or more of the plurality of signal conductors using the zero charge equation; and
simulating, by the one or more processing devices, the electronic design layout using the generated one or more capacitance values.

16. The computer readable storage medium of claim 15, wherein the information handling system further performs actions that include:
assigning a first potential to a first one of the plurality of signal conductors and assigning a second potential to a second one of the plurality of signal conductors, the first potential different than the second potential; and
generating a system of equations that includes the first potential and the second potential, wherein the generation of the capacitance values are based upon the system of equations.

17. The computer readable storage medium of claim 16, wherein the one or more capacitance values are generated a number of times that is equal to the number of plurality of signal conductors and, for each of the capacitance value computations, selecting a different one of the plurality of signal conductors for which to assign the first potential.

18. The computer readable storage medium of claim 15, wherein a first signal conductor is located on a first substrate layer;
the selected metal fill is located on a second substrate layer; and
a second signal conductor is located on a third substrate layer, wherein the second substrate layer is located between the first substrate layer and the second substrate layer.

19. The computer readable storage medium of claim 15, wherein the information handling system further performs actions that include:
selecting a group of metal fills from the plurality of metal fills;
establishing a metal fill grouping boundary around the selected group of metal fills;
generating a zero charge grouping equation for the established metal fill grouping boundary, the zero charge grouping equation establishing that a total group charge residing around the established metal fill grouping boundary is equal to zero; and
generating the one or more capacitance values using the zero charge grouping equation.

20. The computer readable storage medium of claim 15, wherein:
a plurality of metal fill grid points are positioned on the selected metal fill; and
a total charge induced on the metal fill from a plurality of potential differences between the plurality of metal fill grid points and the plurality of neighboring metal fill grid points is equal to zero.

* * * * *